(12) United States Patent
Qian et al.

(10) Patent No.: US 12,187,820 B2
(45) Date of Patent: Jan. 7, 2025

(54) ACRYLATE-BASED SINGLE-CHAIN NANOPARTICLES AND AQUEOUS PHASE PHOTOCHEMICAL MACROSCOPIC PREPARATION METHOD THEREOF

(71) Applicant: Jilin University, Changchun (CN)

(72) Inventors: Hujun Qian, Changchun (CN); He Zhang, Changchun (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 18/783,513

(22) Filed: Jul. 25, 2024

(65) Prior Publication Data

US 2024/0384018 A1   Nov. 21, 2024

(30) Foreign Application Priority Data

Jul. 26, 2023  (CN) .......................... 202310921980.8

(51) Int. Cl.
  *C08F 8/14* (2006.01)
  *C08F 120/06* (2006.01)
  *C08J 3/24* (2006.01)

(52) U.S. Cl.
  CPC .............. *C08F 120/06* (2013.01); *C08J 3/24* (2013.01); *C08F 2810/40* (2013.01); *C08J 2333/02* (2013.01)

(58) Field of Classification Search
  CPC ............. C08F 20/06; C08F 8/14; C08F 12/32
  See application file for complete search history.

(56) References Cited

U.S. PATENT DOCUMENTS

| | | |
|---|---|---|
| 2005/0119500 A1 | 6/2005 | Ackermann et al. |
| 2009/0306422 A1 | 12/2009 | Allard et al. |
| 2011/0318595 A1* | 12/2011 | Breiner .................... C09D 4/00 427/508 |
| 2016/0122276 A1 | 5/2016 | Misske et al. |
| 2018/0119180 A1* | 5/2018 | Kim .......................... C12P 7/62 |

FOREIGN PATENT DOCUMENTS

WO   WO-2021225778 A1 * 11/2021

OTHER PUBLICATIONS

Fu, Advanced Materials Research, vol. 690-693, pp. 1628-1631 (2013) (Year: 2013).*
Christensen, Macromolecules vol. 45, Issue 12, Jun. 26, 2012, pp. 4939-5320 (Year: 2012).*
CNIPA, Notification of First Office Action for Chinese application CN202310921980.8, Apr. 20, 2024.
CNIPA, Notification to grant patent right for Chinese application CN202310921980.8, May 15, 2024.

* cited by examiner

*Primary Examiner* — Robert C Boyle
(74) *Attorney, Agent, or Firm* — Hemisphere Law, PLLC; Zhigang Ma

(57) ABSTRACT

An acrylate-based single-chain nanoparticle is disclosed, which includes 10-20 parts of methacrylic acid, 1-2 parts of tetramethylguanidine and 1-2 parts of halohydrocarbon. The scheme provided by the disclosure establishes a "meta template" for synthesizing various single-chain nanoparticles, unifies the preparation method of the polyacrylate, simultaneously carries out high-concentration preparation in an aqueous phase only through ultraviolet irradiation, which reduces the production cost, reduces the carbon emission in production, and provides possibility for the industrialized production of the polyacrylate-based single-chain nanoparticle.

8 Claims, 3 Drawing Sheets

ACRYLATE-BASED SINGLE-CHAIN NANOPARTICLES AND AQUEOUS PHASE PHOTOCHEMICAL MACROSCOPIC PREPARATION METHOD THEREOF

TECHNICAL FIELD

The disclosure relates to the technical field of polymer materials, in particular to acrylate-based single-chain nanoparticles and its aqueous phase photochemical macroscopic preparation method. The method of the present disclosure is a "meta template" method that can simultaneously obtain multiple different kinds of acrylate-based single-chain nanoparticles by means of post-modification.

BACKGROUND ART

The single-chain nanoparticle is fabricated via intramolecular crosslinking reaction of isolated polymer chains. Its structure is similar to the inherent disordered protein structure formed by polypeptide folding, so that the single-chain nanoparticles can be used as an ideal model system for understanding and simulating the relationship between protein structure and function. At present, the research of single-chain nanoparticles plays an important role in the front application fields of sensors, drug transportation, nano catalysts and so on. However, currently, the single-chain nanoparticles are often custom-designed in a targeted manner based on their experimental or production purposes. Each existing type of single-chain nanoparticle has a fixed composition structure that is not easily adjustable. Additionally, the preparation process for each type of single-chain nanoparticle is system-specific, with singular functional applications lacking universality. If an industrial transformation is to be pursued, it is neither practical nor economical to build different production lines for each kind of single-chain nanoparticles. Therefore, it is imperative to build a "meta template" for the synthesis of various single-chain nanoparticles. Meanwhile, in order to avoid intermolecular crosslinking, the conventional preparation method is often carried out in an extremely dilute organic solution with a concentration of less than 1 mg/ml, making large-scale production difficult. Consequently, the synthesis of single-chain nanoparticles requires a large number of organic solvents, which is not only costly but also not in line with the path of green chemistry development. Each kind of single-chain nanoparticles requires a specific synthesis method and lacks universality. At the same time, conventional methods typically require heating or even high temperatures to achieve intra-chain crosslinking.

Therefore, providing a water-phase photochemical large-scale preparation method for acrylate-based single-chain nanoparticles that can increase the preparation concentration, and avoid the use of high-temperature heating is a technical issue that professionals in this field urgently need to address. This method can significantly reduce costs, improve energy efficiency, reduce emissions, and promote low-carbon production.

SUMMARY

In view of the above, the disclosure provides an acrylate-based single-chain nanoparticle and its aqueous phase photochemical macroscopic preparation method.

To achieve the foregoing objective, the present disclosure adopts the following technical solutions:

A type of acrylate-based single-chain nanoparticle is provided, which is characterized by the following weight percentages of raw materials: 10-20 parts of methyl acrylate, 1-2 parts of tetramethylguanidine, and 1-2 parts of halohydrocarbon.

The beneficial effect of adopting above-mentioned scheme lies in: in the present disclosure, the halohydrocarbon is used as the crosslinking agent, the content of the crosslinking agent is 10%, if the content of the crosslinking agent is too small, the obtained single-chain nanoparticles are more similar to the inherent disordered protein structure, and if the content of the crosslinking agent is too large, the intermolecular crosslinking easily occurs.

Further, the halohydrocarbon is any one of 4-(Bromomethyl)benzophenone, methyl iodide, ethyl bromide, vinyl bromide and benzyl chloride.

The beneficial effect of adopting above-mentioned scheme lies in: in the present disclosure, the hydrophilic-hydrophobic interactions can be regulated by using different halohydrocarbons, and precursor chains (polymer C) which have different types of crosslinking agents can be obtained.

The disclosure also provides an aqueous phase photochemical macroscopic preparation method for the above acrylate-based single-chain nanoparticle, which includes the following steps:
(1) weighing each raw material according to the above weight parts;
(2) taking the weighed methacrylic acid, adding a chain transfer agent and an initiator, and polymerizing the methacrylic acid by RAFT in an oil bath to obtain a polymer chain A;
(3) taking the polymer chain A and performing an end group modification on same by using 4,4'-Azobis(4-cyanovaleric acid) to obtain a polymer B;
(4) esterifying the polymer B with tetramethylguanidine and halohydrocarbon to obtain a polymer chain C containing a halohydrocarbon crosslinking agent;
(5) adding the polymer chain C into water, adjusting a pH value to 5-6 to dissolve the polymer chain C in the water, and then performing ultraviolet crosslinking to obtain a single-chain nanoparticle E, namely the acrylate-single-chain nanoparticle.

Further, in the step (2), a polymerization temperature of the RAFT is 60-70° C., a polymerization stirring rate is 500 r/min, and a polymerization time is 12-36 h.

The beneficial effect of adopting above-mentioned further scheme lies in: in the scheme of the disclosure, precursor chains (polymer C) with different molecular weights can be obtained through different reaction temperatures and reaction times.

Further, in the step (2), the chain transfer agent is 4-cyano-4-(thiobenzoylthio) pentanoic acid; the initiator is 4,4'-Azobis(4-cyanovaleric acid);
the chain transfer agent is used in an amount of 0.8 wt % of methacrylic acid;
the initiator is used in an amount of 0.1 wt % of methacrylic acid.

Further, in the step (3), a temperature of the end group modification is 70-90° C., a stirring rate of the end group modification is 500 r/min, and a reaction time of the end group modification is 4-6 h.

The beneficial effect of adopting above-mentioned further scheme lies in: the disclosure can remove color and toxic groups through the end group modification, thereby providing convenience for subsequent application.

Further, in the step (4), an esterification reaction temperature is 25° C., a reaction stirring rate is 500 r/min, and an esterification reaction time is 12-48 h.

The beneficial effect of adopting above-mentioned further scheme lies in: the esterification reaction of the present disclosure can be used to regulate the hydrophilic-hydrophobic interactions by using different halohydrocarbons, and precursor chains (polymer C) which have different types of crosslinking agents can be obtained.

Further, in the step (5), a temperature of the ultraviolet crosslinking is 25° C., an ultraviolet wavelength is 365 nm, and a reaction time of the ultraviolet crosslinking is 1-12 h.

Further, the aqueous phase photochemical macroscopic preparation method for the acrylate-based single-chain nanoparticle further includes the step (6):

Taking the single-chain nanoparticle E, and performing esterification reaction by tetramethylguanidine and halohydrocarbon to obtain different methacrylate ester single-chain nanoparticles.

Further, in the step (6), a temperature of the esterification reaction is 25° C., a reaction stirring rate is 500 r/min, and an esterification reaction time is 12-48 h.

The beneficial effect of adopting above-mentioned scheme lies in: the scheme can convert methacrylic acid single-chain nanoparticles into methacrylate ester single-chain nanoparticles, so that the methacrylate ester single-chain nanoparticles can be applied to different materials.

The disclosure has the following beneficial effects: the scheme provided by the disclosure establishes a "meta template" for synthesizing various kinds of single-chain nanoparticles, unifies the preparation method of the polyacrylate nanoparticle, simultaneously carries out high-concentration preparation in an aqueous phase only through ultraviolet irradiation, which reduces the production cost, reduces the carbon emission in production, and provides possibility for the industrialized production of the polyacrylate-based single-chain nanoparticle.

DESCRIPTION OF THE ACCOMPANYING DRAWINGS

DETAILED DESCRIPTION OF THE EMBODIMENTS

The following description of the embodiments of the present disclosure will be made clearly and completely with reference to the accompanying drawings, in which it is apparent that the embodiments described are only some embodiments of the present disclosure, but not all embodiments. All other embodiments, which can be made by those skilled in the art based on the embodiments of the disclosure without making any inventive effort, are intended to be within the scope of the disclosure.

Embodiment 1

Figure 1:
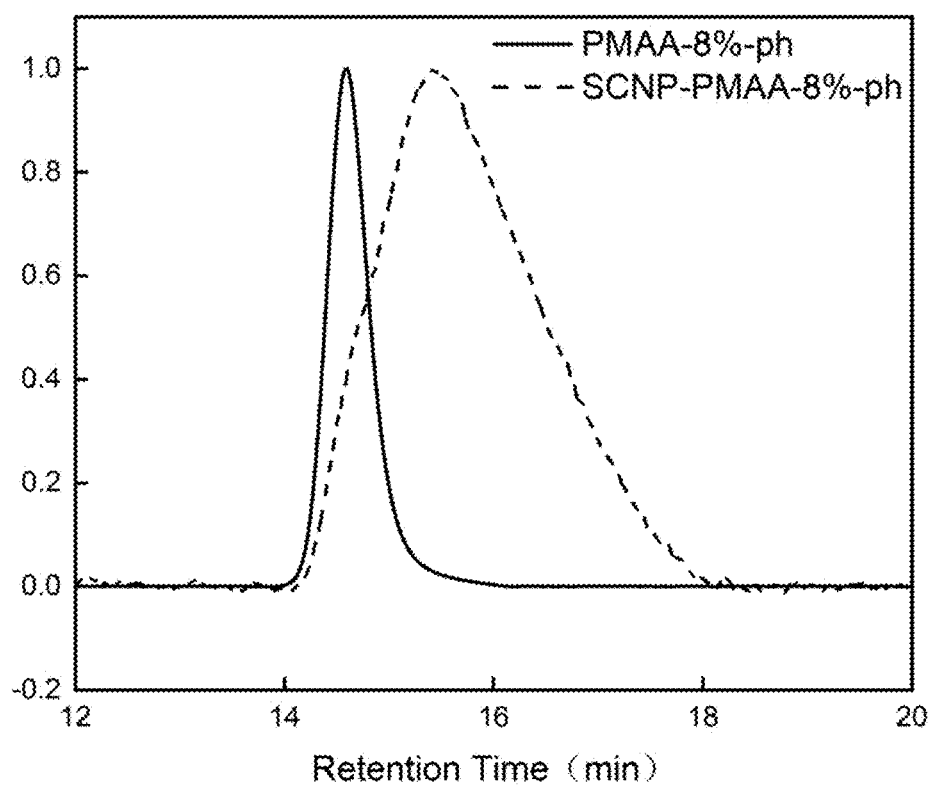
FIG. 1 is a graph showing the retention time of the precursor chain (polymer C) and the resulting acrylate-based single-chain nanoparticle measured in GPC in embodiment 1 of the present disclosure.
Figure 2:
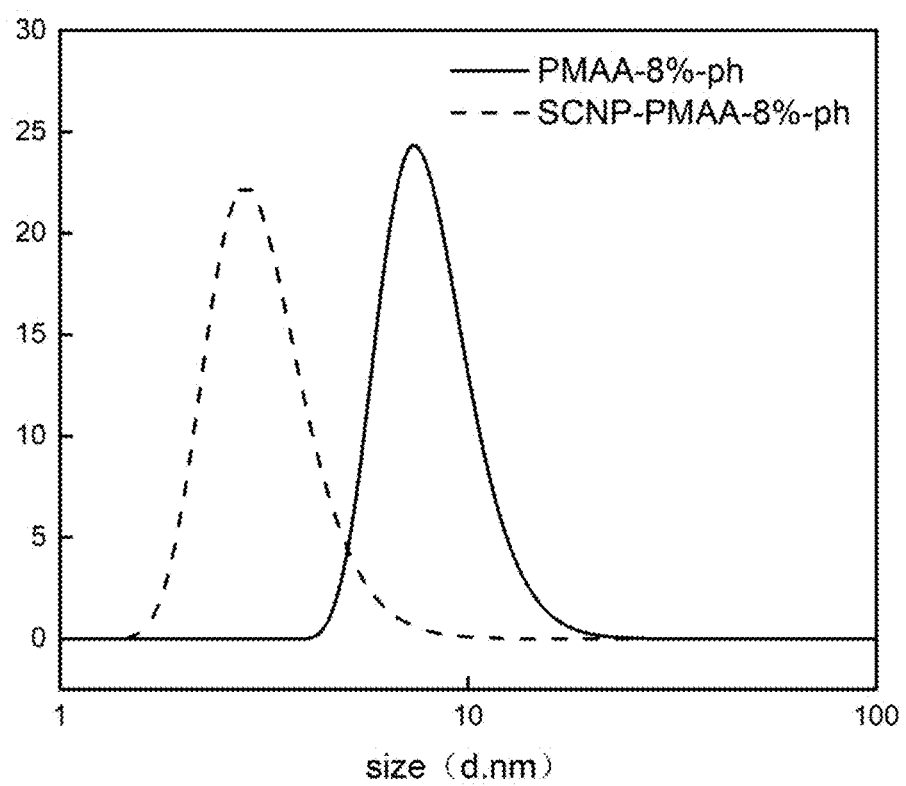
FIG. 2 is a graph showing the particle sizes of the precursor chain (polymer C) and the resulting single-chain nanoparticle measured in DLS in embodiment 1 of the present disclosure.
Figure 3:
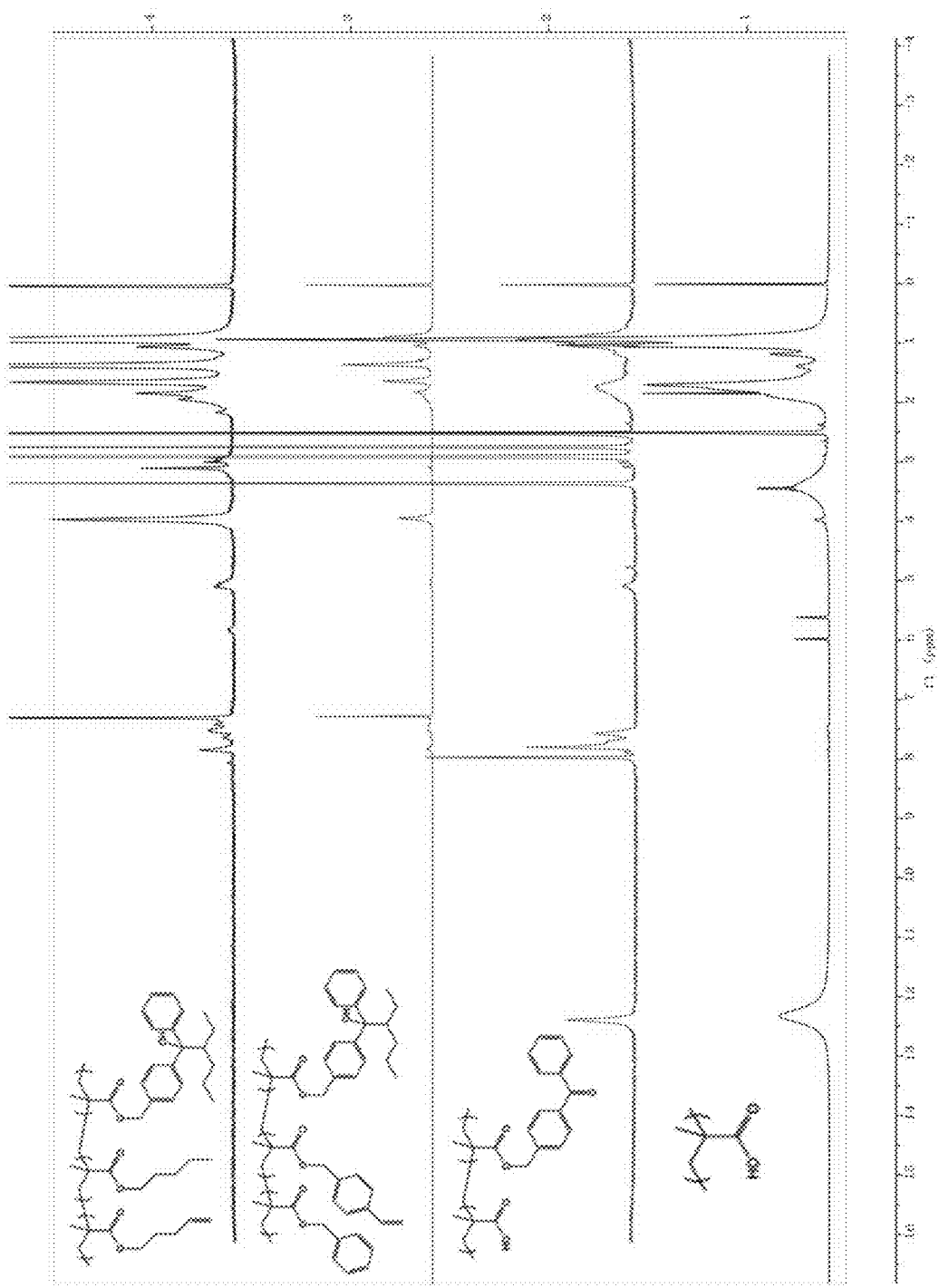
FIG. 3 is a nuclear magnetic resonance chart of polymer B, polymer C and the single-chain nanoparticles obtained after esterification in embodiment 1 of the present disclosure.

An acrylate-based single-chain nanoparticle
(1) 10 parts of methacrylic acid, 1 part of tetramethylguanidine and 1 part of halohydrocarbon were weighted;
(2) The weighed methacrylic acid were taken, 0.8 wt % of 4-cyano-4-(thiobenzoylthio) pentanoic acid and 0.1 wt % of 4,4'-Azobis(4-cyanovaleric acid) were added, and the methacrylic acid was polymerized by RAFT in an oil bath under free radical initiation at 60° C., 500 r/min for 24 h to obtain a polymer chain A;
(3) The polymer chain A was taken and an end group modification was performed on the same by using 4,4'-Azobis(4-cyanovaleric acid) at 80° C., 500 r/min for 5 h to obtain a polymer B;
(4) The polymer B was esterified with tetramethylguanidine and halohydrocarbon at 25° C., 500 r/min for 48 h to obtain a polymer chain C containing a halohydrocarbon crosslinking agent;
(5) The polymer chain C was added into water, the pH value was adjusted to dissolve the polymer chain C in the water, and then ultraviolet crosslinking was performed at 25° C., 365 nm for 6 h to obtain a single-chain nanoparticle E, namely the acrylate-based single-chain nanoparticle.
(6) The single-chain nanoparticle E was taken, and esterification reaction was performed by tetramethylguanidine at 25° C., 500 r/min for 12 h to obtain different methacrylate ester single-chain nanoparticles As can be seen from FIG. 1 and FIG. 2, the single-chain nanoparticles are obtained by perform intermolecular crosslinking on the polymer C in the embodiment of the disclosure. As can be seen from FIG. 3, the methacrylic acid single-chain nanoparticles prepared by the method of the present disclosure can be esterified into different methacrylate ester single-chain nanoparticles.

Embodiment 2

An acrylate-based single-chain nanoparticle
(1) 20 parts of methacrylic acid, 2 parts of tetramethylguanidine and 2 parts of halohydrocarbon were weighted;
(2) The weighed methacrylic acid were taken, 0.8 wt % of 4-cyano-4-(thiobenzoylthio) pentanoic acid and 0.1 wt % of 4,4'-Azobis(4-cyanovaleric acid) were added, and the methacrylic acid was polymerized by RAFT in an oil bath under free radical initiation at 70° C., 500 r/min for 12 h to obtain a polymer chain A;
(3) The polymer chain A was taken and an end group modification was performed by using a halohydrocarbon at 90° C., 500 r/min for 4 h to obtain a polymer B;
(4) The polymer B was esterified with tetramethylguanidine and halohydrocarbon at 25° C., 500 r/min for 12 h to obtain a polymer chain C containing a halohydrocarbon crosslinking agent;
(5) The polymer chain C was added into water, the pH value was adjusted to dissolve the polymer chain C in the water, and then ultraviolet crosslinking was performed at 25° C., 365 nm for 12 h to obtain a single-chain nanoparticle E, namely the acrylate-based single-chain nanoparticle.

Embodiment 3

An acrylate-based single-chain nanoparticle
(1) 12 parts of methacrylic acid, 1.5 parts of tetramethylguanidine and 1.5 parts of halohydrocarbon were weighted;

(2) The weighed methacrylic acid were taken, 0.8 wt % of 4-cyano-4-(thiobenzoylthio) pentanoic acid and 0.1 wt % of 4,4'-Azobis(4-cyanovaleric acid) were added, and the methacrylic acid was polymerized by RAFT in an oil bath under free radical initiation at 65° C., 500 r/min for 36 h to obtain a polymer chain A;

(3) The polymer chain A was taken and an end group modification was performed on the same by using 4,4'-Azobis(4-cyanovaleric acid) at 70° C., 500 r/min for 6 h to obtain a polymer B;

(4) The polymer B was esterified with tetramethylguanidine and halohydrocarbon at 25° C., 500 r/min for 36 h to obtain a polymer chain C containing a halohydrocarbon crosslinking agent;

(5) The polymer chain C was added into water, the pH value was adjusted to dissolve the polymer chain C in the water, and then ultraviolet crosslinking was performed at 25° C., 365 nm for 1 h to obtain a single-chain nanoparticle E, namely the acrylate-based single-chain nanoparticle.

While embodiments of the present disclosure have been shown and described above, it will be understood that the above embodiments are illustrative and not to be construed as limiting the disclosure, and that changes, modifications, alternatives and variations may be made to the above embodiments by one of ordinary skill in the art within the scope of the disclosure.

What is claimed is:

1. An aqueous phase photochemical macroscopic preparation method for the acrylate-based single-chain nanoparticle, comprising the following steps:
   (1) weighing 10-20 parts of methacrylic acid, 1-2 parts of tetramethylguanidine and 1-2 parts of halohydrocarbon according to the weight parts; the halohydrocarbon is 4-(Bromomethyl)benzophenone;
   (2) taking the methacrylic acid, adding a chain transfer agent and an initiator, and polymerizing the methacrylic acid by RAFT in an oil bath to obtain a polymer chain A;
   (3) taking the polymer chain A and performing an end group modification on same by using 4,4'-Azobis(4-cyanovaleric acid) to obtain a polymer B;
   (4) esterifying the polymer B with tetramethylguanidine and the halohydrocarbon to obtain a polymer chain C containing a crosslinking agent;
   (5) adding the polymer chain C into water, adjusting a pH value to 5-6 to dissolve the polymer chain C in the water, and then performing ultraviolet crosslinking to obtain a single-chain nanoparticle E, namely the acrylate-based single-chain nanoparticle.

2. The aqueous phase photochemical macroscopic preparation method for the acrylate-based single-chain nanoparticle of claim 1, wherein in step (2) a polymerization temperature of the RAFT is 60-70° C., a polymerization stirring rate is 500 r/min, and a polymerization time is 12-36 h.

3. The aqueous phase photochemical macroscopic preparation method for the acrylate-based single-chain nanoparticle of claim 1, wherein in step (2), the chain transfer agent is 4-cyano-4-(thiobenzoylthio) pentanoic acid; the initiator is 4,4'-Azobis(4-cyanovaleric acid);

the chain transfer agent is used in an amount of 0.8 wt % of methacrylic acid;

the initiator is used in an amount of 0.1 wt % of methacrylic acid.

4. The aqueous phase photochemical macroscopic preparation method for the acrylate-based single-chain nanoparticle of claim 1, wherein in step (3), a temperature of the end group modification is 70-90° C., a stirring rate of the end group modification is 500 r/min, and a reaction time of the end group modification is 4-6 h.

5. The aqueous phase photochemical macroscopic preparation method for the acrylate-based single-chain nanoparticle of claim 1, wherein in step (4), a reaction temperature is 25° C., a reaction stirring rate is 500 r/min, and a reaction time is 12-48 h.

6. The aqueous phase photochemical macroscopic preparation method for the acrylate-based single-chain nanoparticle of claim 1, wherein in step (5), a temperature of the ultraviolet crosslinking is 25° C., an ultraviolet wavelength is 365 nm, and a reaction time of the ultraviolet crosslinking is 1-12 h.

7. The aqueous phase photochemical macroscopic preparation method for the acrylate-based single-chain nanoparticle of claim 1, further comprising step (6):

performing a second esterification reaction using tetramethylguanidine.

8. The aqueous phase photochemical macroscopic preparation method for the acrylate-based single-chain nanoparticle of claim 7, wherein in step (6), a temperature of the second esterification reaction is 25° C., a reaction stirring rate is 500 r/min, and a reaction time is 12-48 h.

\* \* \* \* \*